United States Patent [19]

Herbst et al.

[11] Patent Number: 4,814,068
[45] Date of Patent: Mar. 21, 1989

[54] FLUID CATALYTIC CRACKING PROCESS AND APPARATUS FOR MORE EFFECTIVE REGENERATION OF ZEOLITE CATALYST

[75] Inventors: Josheph A. Herbst, Turnersville; Hartley Owen, Belle Mead, both of N.J.; Paul H. Schipper, Wilmington, Del.

[73] Assignee: Mobil Oil Corporation, New York, N.Y.

[21] Appl. No.: 903,362

[22] Filed: Sep. 3, 1986

[51] Int. Cl.[4] .................... G01J 8/26; C10G 11/04
[52] U.S. Cl. .................... 208/155; 208/113; 208/156; 208/164; 208/120; 422/142; 422/146
[58] Field of Search .............. 208/152, 153, 155, 156, 208/157, 74, 75, 78, 111, 120, 120 MC, 144, 147, 164; 422/140–144, 146

[56] References Cited

U.S. PATENT DOCUMENTS

| | | | |
|---|---|---|---|
| 3,748,251 | 7/1973 | Demmel et al. | 208/74 |
| 3,758,403 | 9/1973 | Rosinski et al. | 208/120 |
| 3,856,659 | 12/1974 | Owen | 208/80 |
| 3,886,000 | 5/1975 | Owen | 208/120 |
| 3,894,931 | 7/1975 | Nace et al. | 208/73 |
| 3,894,934 | 7/1975 | Owen et al. | 208/78 |
| 4,035,285 | 7/1977 | Owen et al. | 208/120 |
| 4,116,814 | 9/1978 | Zahner | 208/78 |
| 4,325,833 | 4/1982 | Scott | 252/417 |
| 4,331,533 | 5/1982 | Dean et al. | 208/113 |
| 4,336,160 | 6/1982 | Dean et al. | 252/417 |
| 4,388,218 | 6/1983 | Rowe | 252/417 |
| 4,404,095 | 9/1983 | Haddad et al. | 208/164 |
| 4,427,537 | 1/1984 | Dean et al. | 208/120 |
| 4,444,722 | 4/1984 | Owen | 422/144 |
| 4,502,947 | 3/1985 | Haddad et al. | 208/161 |
| 4,584,090 | 4/1986 | Farnsworth | 208/80 |

*Primary Examiner*—Glenn Caldarola
*Attorney, Agent, or Firm*—Alexander J. McKillop; Charles J. Speciale; Richard D. Stone

[57] ABSTRACT

A multistage process and apparatus for regenerating fluid catalytic cracking catalyst is disclosed. Each stage preferably has a successively higher temperature, and flue gas is removed after each stage. The process may regenerate a single phase catalyst or, preferably, a dual phase catalyst system, wherein an intermediate pore zeolite catalyst contained within a less elutriatable catalyst particle and a larger pore zeolite catalyst contained within a more elutriatable catalyst particle, thereby separating the intermediate pore zeolite catalysts from the larger pore zeolite catalysts prior to a final regeneration step.

30 Claims, 3 Drawing Sheets

FLUID CATALYTIC CRACKING PROCESS AND APPARATUS FOR MORE EFFECTIVE REGENERATION OF ZEOLITE CATALYST

BACKGROUND OF THE INVENTION

1. Field of the Invention

This invention relates to a process and apparatus for regenerating fluidized cracking catalyst. More particularly, it relates to a process and apparatus including staged regeneration and separation of flue gas from catalyst particles to minimize or substantially eliminate hydrothermal deactivation.

2. Discussion of the Prior Art

The field of catalytic cracking, and particularly fluid catalyst operations, has undergone significant development improvements due primarily to advances in catalyst technology and product distribution obtained therefrom. With the advent of high activity catalyst and particularly crystalline zeolite cracking catalysts, new areas of operating technology have been encountered, requiring even further refinements in processing techniques to take advantage of the high catalyst activity, selectivity and operating sensitivity.

By way of background, the hydrocarbon conversion catalyst usually employed in a fluid catalytic cracking (FCC) installation is preferably a high activity crystalline zeolite catalyst of a fluidizable particle size. The catalyst is transferred in suspended or dispersed phase condition generally upwardly through one or more riser conversion zones (fluid catalytic cracking zones), providing a hydrocarbon residence time in each conversion zone in the range of 0.5 to about 10 seconds, and usually less than about 8 seconds. High temperature riser hydrocarbon conversions, occurring at temperatures of about 1000° F. or higher and at 0.5 to 4 seconds hydrocarbon residence time in contact with the catalyst in the riser, are desirable for some operations before initiating separation of vaporous hydrocarbon materials from the catalyst. Rapid separation of catalyst from hydrocarbons discharged from a riser conversion zone is particularly desirable for restricting hydrocarbon overcracking.

Closed cyclone systems have been employed in fluid catalytic cracking reactor vessels to quickly separate hydrocarbon product from cracking catalyst, thereby preventing overcracking. Closed cyclone systems are further discussed in U.S. Pat. No. 4,502,947 to Haddad et al, herein incorporated by reference.

During the hydrocarbon conversion step, carbonaceous deposits accumulate on the catalyst particles and the particles entrain hydrocarbon vapors upon removal from the hydrocarbon conversion step. The entrained hydrocarbons are subjected to further contact with the catalyst until they are removed from the catalyst by stripping gas in a separate catalyst stripping zone. Hydrocarbon products separated from the catalyst and stripped materials are combined and typically passed to a product fractionation step. Stripped catalyst (spent catalyst) containing deactivating amounts of carbonaceous material, hereinafter referred to as coke, is then passed to a catalyst regeneration operation.

In catalyst regeneration, the spent catalyst contacts oxygen to burn off coke. However, spent catalyst contains hydrogen-containing components, such as coke, adhering thereto. This causes hydrothermal degradation because the hydrogen reacts with oxygen in the regenerator to form water.

U.S. Pat. No. 4,336,160 to Dean et al attempts to reduce hydrothermal degradation by staged regeneration. However, the first stage of the regeneration process of Dean et al employs a dense bed which provides an opportunity for hydrothermal deactivation.

Fluid catalytic cracking regenerators have been developed which employ a fast fluid bed riser. Such a fast fluid bed is disclosed in U.S. Pat. No. 4,444,722 to Owen, herein incorporated by reference.

Both intermediate pore zeolites, such as ZSM-5, and large pore zeolites, such as zeolite Y, are employed for fluid catalytic cracking. Combinations of ZSM-5 and other zeolites, such as zeolite Y, have been disclosed in U.S. Pat. No. 3,758,403 to Rosinski et al, herein incorporated by reference.

Intermediate pore zeolites, particularly ZSM-5, do not coke up as rapidly do the large pore zeolites, for example, zeolite Y. Therefore, ZSM-5 requires less regeneration than zeolite Y.

It would be desirable to minimize hydrothermal degradation. It would further be desirable to employ a combination of ZSM-5 catalyst particles and zeolite Y catalyst particles in a process which does not regenerate the ZSM-5 catalyst to the extent which it regenerates zeolite Y containing catalysts.

SUMMARY OF THE INVENTION

It is one object of the present invention to provide a staged fluid catalytic cracking regeneration process and apparatus which minimizes hydrothermal degradation.

It is another object of the present invention to provide a fluid cracking process and apparatus which simultaneously employs intermediate pore zeolite catalysts and large pore zeolite catalysts, but regenerates intermediate pore zeolite catalysts less than it does large pore zeolite catalysts.

It is another object of the present invention to provide a fluid cracking regenerator process and apparatus which produces a hot flue gas stream and preheats an airstream fed to the process and apparatus by indirect heat exchange with the flue gas.

The present invention minimizes hydrothermal degradation of crystalline zeolite fluid catalytic cracking catalyst by burning hydrocarbons from the coked catalyst by contact with air in stages and removing flue gas after each stage of burning. This is particularly advantageous in fluid catalytic cracking processes which employ ZSM-5. The present invention adds sufficient air per regeneration stage to sustain burning, preferably just enough air per regeneration stage to sustain burning, and quickly removes the flue gas formed during the burning. Preferably, the flue gas is removed by being displaced away from the catalyst by contacting the catalyst with a gas.

The first stage regeneration occurs in a riser regenerator, by contacting catalyst with a first oxygen-containing gas stream, followed by quick separation of a first flue gas stream from the catalyst. A second regenerator stage is provided by a fast fluid bed, wherein catalyst from the first stage contacts a second oxygen-containing gas stream. The catalyst discharged from an upper portion of the fast fluid bed is then quickly separated into a second flue gas stream, with the remaining catalyst passing to a third stage regeneration. In the third stage, the catalyst contacts a third oxygen-containing gas stream, and thus forms a third flue gas stream which is separated from the catalyst. The catalyst in the first riser is maintained at a temperature between 1000° and 1250° F. (538° 677° C.). The catalyst in the fast fluid bed is maintained at a temperature between 50° F. (28° C.) above the temperature of the catalyst in the first riser and 1400° F. (760° C.). The second bed of catalyst is maintained at a temperature between 25° F. (14° C.), preferably 100° F. (56° C.) above the fast fluid bed temperature and 1600° F. (871° C.).

The present invention is particularly advantageous when a dual phase catalyst system, comprising intermediate pore zeolite catalyst particles and large pore zeolite catalyst particles, is employed. The intermediate pore zeolite catalyst particles are sufficiently less elutriatable than the large pore zeolite catalyst particles, thereby enabling easy separation of the large pore zeolite catalyst particles from the intermediate pore particles. This enables the intermediate pore zeolite catalyst particles to be separated from the large pore zeolite catalyst particles prior to the second or third stage of regeneration. Thus, the large pore zeolite catalyst particles pass to additional regeneration in the third stage, while the intermediate pore zeolite catalyst particles directly pass to a riser conversion zone of a fluid catalytic cracking reactor. This has the advantage that it minimizes exposure of intermediate pore zeolite catalysts to the highest regeneration temperatures, and thus reduces deactivation. The intermediate pore zeolite catalyst particles are less elutriatable than the large pore zeolite catalyst particles by making the intermediate pore zeolite catalyst particles either denser, larger, more irregular, or a combination of these parameters, relative to the large pore zeolite catalyst particles.

DETAILED DESCRIPTION OF THE INVENTION

A fluid catalytic cracking (FCC) process or apparatus employs a catalyst in the form of fine catalyst particles which act as a fluid when aerated with a vapor. The fluidized catalyst is circulated continuously between a reactor and a regenerator and acts as a vehicle to transfer heat from the regenerator to the hydrocarbon feed and reactor. The fluid catalytic cracking process or apparatus is valuable to convert heavy hydrocarbons into more valuable distillate gasoline and lighter products. The present process involves staged regeneration, wherein less elutriatable catalyst particles are removed in upstream stages and more elutriatable particles then pass to downstream stages.

Conventional cracking catalyst components are generally amorphous silica-alumina and crystalline silica-alumina. Other materials said to be useful as cracking catalysts are the crystalline silicoaluminophosphates of U.S. Pat. No. 4,440,871 and the crystalline metal aluminophosphates of U.S. Pat. No. 4,567,029.

However, the major conventional cracking catalysts presently in use generally comprise a large pore crystalline silicate zeolite, generally in a suitable matrix component which may or may not itself possess catalytic activity. These zeolites typically possess an average crystallographic pore dimension of about 7 Angstroms and above for their major pore opening. Representative crystalline silicate zeolite cracking catalysts of this type include zeolite X (U.S. Pat. No. 2,882,244), zeolite Y (U.S. Pat. No. 3,130,007), zeolite ZK-5, (U.S. Pat. No. 3,247,195), zeolite ZK-4 (U.S. Pat. No. 3,314,752), merely to name a few, as well as naturally-occurring zeolites, such as chabazite, faujasite, mordenite and the like. Also useful are the silicon-substituted zeolites described in U.S. Pat. No. 4,503,023. Zeolite Beta is yet another large pore crystalline silicate which can constitute a component of the mixed catalyst system utilized herein.

It is, of course, within the scope of this invention to employ two or more of the foregoing amorphous and/or large pore crystalline zeolite cracking catalysts as the first catalyst component of the mixed catalyst system. It is further contemplated that the entire mixed catalyst system can be made up solely of two or more amorphous and/or large pore crystalline silicate cracking catalysts, provided at least one catalyst requires frequent regeneration (the first catalyst component) and another catalyst in the system needs regeneration only on a relatively infrequent basis (the second catalyst component). Thus, for example, a mixed catalyst system in accordance with the invention can be made up of zeolite Y, a catalyst which requires frequent regeneration, but is fairly stable under the conditions prevailing in the regenerator, and Zeolite Beta, a catalyst which need not be regenerated as frequently as zeolite Y. Preferred large pore crystalline silicate zeolite components include the synthetic zeolites mordenite and faujasite and the synthetic zeolites X and Y, with particular preference being accorded zeolites Y, REY, USY and REUSY and mixtures thereof.

The shape-selective medium pore crystalline silicate zeolite catalyst constituting the second catalyst component of the mixed catalyst system is exemplified by ZSM-5, ZSM-11, ZSM-12, ZSM-23, ZSM-35, ZSM-38, ZSM-48 and other similar materials. U.S. Pat. No. 3,702,886, describing and claiming ZSM-5, is incorporated herein by reference. Also, U.S. Pat. No. Re. 29,948, describing and claiming a crystalline material with an X-ray diffraction pattern of ZSM-5, is incorporated herein by reference, as is U.S. Pat. No. 4,061,724, describing a high silica ZSM-5 referred to as "silicalite" therein.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is more particularly described in U.S. Pat. No. 4,375,373, the entire contents of which are incorporated herein by reference.

The preferred shape-selective medium pore crystalline silicate zeolite components of the mixed catalyst system herein are ZSM-5, ZSM-11, ZSM-12, ZSM-23, ZSM-35 and ZSM-38, with ZSM-5 being particularly preferred.

In general, the aluminosilicates zeolites are effectively employed herein. However, zeolites in which some other framework element which is present in partial or total substitution of aluminum can be advantageous. For example, such catalysts may provide a higher conversion of feed to aromatic components, the latter tending to increase the octane, and therefore the quality, of the gasoline produced in the process. Illustrative of elements which can be substituted for part or all of the framework aluminum are boron, gallium, titanium and any other trivalent metal which is heavier than aluminum. Specific examples of such catalysts include ZSM-5 and Zeolite Beta containing boron, gallium and/or titanium. In lieu of, or in addition to, being incorporated into the zeolite framework, these and other catalytically active elements can also be deposited upon the zeolite by any suitable procedure, e.g., impregnation.

Separation of particles of first catalyst component from particles of second catalyst component in a regenerating unit can be accomplished in several ways.

Separation within the regenerating unit can be achieved by classifying the first and second catalyst components according to their average particle densities, which can be made to be significantly different in various ways, including by appropriate selection of the matrix components with which they are composited, as more fully explained below. In general, smaller, less dense catalyst particles will tend, on the average, to define an upper phase within the regenerator floating upon larger, more dense catalyst particles which, conversely, will tend, on the average, to define a lower phase within the regenerator.

The characterizing physical properties of the first and second catalyst components are so selected that they each will exhibit different settling rates, designated $R^1$ and $R^2$, respectively, which permit the catalyst particles having the greater settling rate to discharge from the regenerator sooner than the catalyst particles having the lower settling rate. Residence time of catalyst particles in a fluidized- or riser-type regenerator is primarily dependent on two factors: the linear velocity of the fluid stream within the riser, which tends to carry the entire catalyst bed up and out of the regenerator into the separator unit, and the opposing force of gravity, which tends to keep the slower moving catalyst particles within the regenerator. Ordinarily, in a mixed catalyst system, both catalyst components will circulate through the system at about the same rate. As previously pointed out, this has proven disadvantageous to the efficiency of the system, since the medium pore zeolite or other catalyst component which does not require as frequent regeneration as the cracking catalyst will be needlessly subjected to the catalyst-degrading conditions of the regenerator, with the result that its useful catalytic life will be shortened. However, in accordance with this invention, it is possible to discharge the less coke deactivated catalyst from the regenerator sooner than the more coke deactivated catalyst is discharged. To bring about this separation of a particular component of the mixed catalyst system within the regenerator, the average density, particle size, and/or shape of the catalyst particles can be adjusted in a number of ways as to provide the desired settling characteristics.

Among the techniques which can be used for making one catalyst component more dense than the other is compositing each catalyst with a matrix component of substantially different density. Useful matrix components include the following:

| Matrix Component | Particle Density (gm/cm$_3$) |
| --- | --- |
| Alumina | 3.9–4.0 |
| Silica | 2.2–2.6 |
| Magnesia | 3.6 |
| Beryllia | 3.0 |
| Barium Oxide | 5.7 |
| Zirconia | 5.6–5.9 |
| Titania | 4.3–4.9 |

Combinations of two or more of these and/or other suitable porous matrix components, e.g., silica-alumina, silica-magnesia, silica-thoria, silica-alumina-zirconia, etc., can be employed for a still wider spectrum of density values from which one may select a specific predetermined value as desired.

In general, selection of each matrix component will be such that the catalyst which is to have the lower rate of circulation through the regenerator will be more dense than the catalyst requiring frequent regeneration. For example, in the case of a mixed catalyst system containing medium pore and large pore crystalline silicate zeolites, where it is desired to reduce the residency time of the medium pore zeolite in the regenerator, the overall packed density of the medium pore zeolite particles, inclusive of its matrix component, can advantageously vary from about 0.6 to about 4.0 gm/cm$_3$, and preferably from about 2.0 to about 3.0 gm/cm$_3$, and the overall packed density of the large pore zeolite catalyst particles, inclusive of its matrix component, can advantageously vary from about 0.4 to about 1.1 gm/cm$_3$ density, and preferably from about 0.6 to about 1.0 gm/cm$_3$.

Another useful technique for adjusting the density of each catalyst component, again in the case of a mixture of medium and large pore zeolite catalysts, is to composite the medium pore zeolite catalyst particles with a material which tends to coke up faster than the particles of large pore zeolite catalysts, such resulting in an increase in the density of the former in situ. Illustrative of such materials are hydrated alumina which in situ forms a transition alumina which has a high coking rate. This embodiment possesses several additional advantages. In the coked-up state, the composited medium pore silicate zeolite catalyst is more resistant to attrition, which results from collision with other particles in the regenerator. The individual catalyst particles can sustain more collisions, and thus serve as a practical means of adjusting the velocity of the large pore zeolite catalyst particles through the regenerator (the latter, in colliding with the medium pore zeolite catalyst particles, will, as a result, have reduced velocity). In addition, the coked-up composited medium pore zeolite catalyst particles will tend to accumulate metals present in the feed.

As previously stated, the relative settling rate of each catalyst component can be altered by varying the average particle size of the catalyst particles. This can be readily accomplished at the time of compositing the zeolite catalyst particles with various matrix components. As between two catalyst components of significantly different average particle size, the larger will tend to discharge from the regenerator sooner than the smaller. Where it is desired to decrease the residency time, say, of the medium pore zeolite catalyst particles in the regenerator relative to that of the large pore zeolite catalyst component, the average particle size of the former will usually be larger than that of the latter. So, for example, the average particle size of the medium pore zeolite catalyst particles can be made to vary from about 500 to about 70,000 microns, and preferably from about 1000 to about 25,000 microns, while the average particle size of the large pore zeolite catalyst particles can be made to vary from about 20 to about 150 microns, and preferably from about 50 to about 100 microns.

The shape, or geometric configuration, of the catalyst particles also affects their relative settling rates, the more irregular the shape (i.e., the more the shape deviates from a sphere), the shorter the residency time of the particles in the regenerator. Irregular-shaped particles can be simply and readily achieved by crushing a catalyst-matrix extrudate or using an extruded catalyst.

As will be appreciated by those skilled in the art, the settling rate for a particular catalyst component will result from the interaction of each of the three foregoing factors, i.e., density, average particle size and particle shape. The factors can be combined in such a way that they each contribute to the desired result. For example, the particles of the less coke deactivated catalyst can simultaneously be made denser, larger and more irregular in shape than the catalyst particles requiring frequent regeneration. However, a differential settling rate can still be provided, even if one of the foregoing factors partially offsets another, as would be the case where greater density and smaller average particle size co-exist in the same catalyst particle. Regardless of how these factors of particle density, size and shape are established for a particular catalyst component, their combined effect will, of course, be such as to result in a significant differential in settling rates of the components comprising the mixed catalyst system of this invention.

The shape-selective medium pore crystalline silicate zeolite catalyst can be present in the mixed catalyst system over widely varying levels. For example, the zeolite concentration of the second catalyst can be present at a level as low as about 0.01 to about 1.0 wt % of the total catalyst inventory (as in the case of the catalytic cracking process of U.S. Pat. No. 4,368,114) and can represent as much as 25 wt % of the total catalyst system.

The reactor (not shown) of a fluid catalytic cracking unit is preferably operated under fluidized flow conditions at a temperature within the range of from about 900° to about 1250° F. (482°–682° C.). Suitable chargestocks for cracking comprise the hydrocarbons generally and, in particular, petroleum fractions having an initial boiling point range of at least 400° F. (204° C.), a 50% point range of at least 500° F. (260° C.), and an end point range of at least 600° F. (316° C.). Such hydrocarbon fractions include gas oils, thermal oils, residual oils, cycle stocks, whole top crudes, tar sands oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 750° F. (404° C.) must be carried out under vacuum in order to avoid thermal cracking. The boiling temperatures utilized herein are expressed in terms of convenience of the boiling point corrected to atmospheric pressure.

Figure 1:
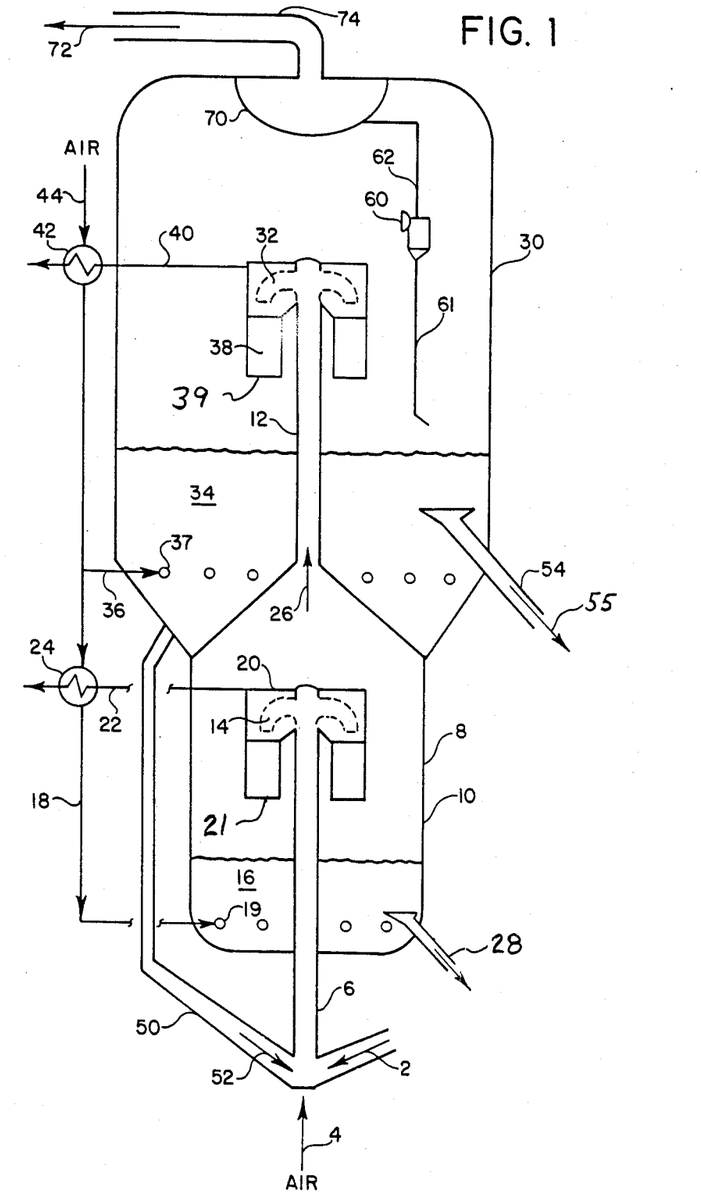
FIG. 1 is a schematic representation of a partial cross-section of a fluid catalytic cracking (FCC) regenerator of an embodiment of the present invention.

FIG. 1 discloses a spent catalyst stream 2 from a fluid catalytic cracking reactor (not shown). The spent catalyst may be any fluid catalytic cracking catalyst, but is preferably a combination of particles comprising intermediate pore zeolite and particles comprising large pore zeolite, most preferably comprising ZSM-5 and zeolite Y, respectively. The spent catalyst stream 2 combines with a first airstream 4, and preferably regenerated recycle catalyst stream 52 from an optional standpipe 50, to form a mixture. The mixture passes through a first regenerator riser 6. Preferably, the mixture passes through riser 6 at regeneration conditions comprising a mixture temperature between 1000° and 1250° F. (538°–677° C.). The mixture is discharged from the first riser 6 and passes into a plurality of discharge arms 14 which impart downward momentum to the mixture. The discharge arms 14 are housed within a riser cover 20 having an open bottom 21.

After exiting the discharge arms 14, the mixture countercurrently contacts upwardly passing combustion gas from a first catalyst bed 16. This displaces gaseous material upwardly and away from the catalyst to form a first flue gas stream 22. The remaining catalyst from the mixture continues downwardly into the first catalyst bed 16, which is located in a lower portion 10 of a second regenerator riser 8. Preferably, the bed 16 is maintained at a temperature between 50° F. (28° C.) above the temperature of the catalyst in the first regenerator and 1400° F. (760° C.). The lower portion 10 has a larger inside diameter than an upper portion 12 to which it is attached. A second airstream 18 passes through a header 19 into the first catalyst bed 16 to promote further regeneration, which produces water-containing combustion gas. Stream 18 may be preheated by indirect heat exchange with the first flue gas stream 22 in a heat exchanger 24. Heat exchanging the flue gas 22 with the air stream 18 heats the air, and thereby lowers the air density and increases its ability to lift catalyst. Furthermore, heat exchange conserves heat. Removing the flue gas 22 necessitates increasing air into the riser 8 to continue transporting the catalyst. This increases the necessary amount of heat in the riser 8. The heat exchange recovers some of the heat. The amount of air passed into the first catalyst bed 16 is, preferably, the minimum amount sufficient to sustain combustion in the bed 16 so that hydrogen is removed from catalyst without substantial hydrothermal degradation. The air also displaces the water vapor-containing combustion gas away from catalyst bed 16.

A first portion of partially regenerated catalyst 26 is elutriated away from first bed 16 by the airstream 18 and combustion gases formed in bed 16. The first portion of catalyst 26 passes upwardly away from bed 16 into the upper portion 12 of the second regeneration riser 8. A second portion of partially regenerated catalyst is withdrawn from bed 16 through a withdrawal conduit 28 and passes to the fluid catalytic cracking reactor (not shown).

The first portion of catalyst 26 passing through upper portion 12, which is located within a catalyst collecting chamber 30. Portion 26 is discharged from upper portion 12 into a plurality of discharge arms 32 which impart downward momentum to the catalyst. The discharge arms 32 are housed within a riser cover 38, which has an open bottom 39, and the downwardly directed catalyst countercurrently contacts combustion gases, from a second catalyst bed 34 located therebelow, which displaces gaseous material upwardly and away from the downwardly directed catalyst. The displaced gases form a second flue gas stream 40 which exits the chamber 30 and indirectly preheats an airstream 44 in heat exchanger 42. Exchanger 42, similar to exchanger 24 discussed above, conserves heat and increases the ability of airstream 44 to lift catalyst in chamber 30. The catalyst continues downwardly to the second catalyst bed 34. A third airstream 36 passes through a header 37 into the second bed 34 to contact catalyst in bed 34.

The regenerated recycle catalyst stream 52 is withdrawn from second catalyst bed 34 through a standpipe 50 and the catalyst 52 combines with airstream 4 and spent catalyst stream 2, as discussed above. A product regenerated catalyst stream 55 is withdrawn from second catalyst bed 34 through a catalyst withdrawal conduit 54 and passed to a fluid catalytic cracking reactor (not shown). Preferably, the minimum amount of air sufficient to maintain combustion in bed 34 is supplied by airstream 36. Airstream 36 also displaces water-containing combustion gases away from bed 34, and thereby reduces hydrothermal deactivation. Preferably, the second bed 34 is maintained at a temperature between 25° F. (14° C.) above that of first catalyst bed 16 and 1600° F. (871° C.). Most preferably, between 100° F. (56° C.) above that of first catalyst bed 16 and 1600° F. (871° C.).

A second portion of regenerated catalyst is withdrawn from bed 34 through the catalyst withdrawal conduit 54 and passes to a fluid catalytic cracking reactor (not shown). Withdrawing catalyst from the first bed 16 through conduit 28 and withdrawing another stream of more thoroughly regenerated catalyst from the second catalyst bed 34 through the withdrawal conduit 54 improves the flexibility of a fluid catalytic cracking regenerator. The catalyst withdrawn through conduit 28 from bed 16 is not subjected to the higher temperatures of catalyst bed 34, and therefore is less likely to be subject to thermal degradation. Furthermore, this embodiment minimizes the amount of catalyst subject to the highest temperatures of regeneration.

This embodiment is particularly advantageous in two-phase catalyst systems employing particles comprising intermediate pore zeolites, such as ZSM-5, and particles comprising large pore zeolites, such as zeolite Y. The intermediate pore zeolite catalyst particles would be designed to be less elutriatable than the large pore zeolite catalyst particles, so the large pore zeolite catalyst particles would be elutriated out of bed 16 and entrained upwardly through upper portion 12 of second riser 8. The intermediate pore zeolite catalyst particles would be designed to be less elutriatable than the larger pore zeolite catalyst particles by being either more dense or larger (measured by average particle size), or both, relative to the large pore zeolite catalyst particles. Employing an irregularly-shaped particle has directionally the same effect on elutriation as increasing particle size. An example of an irregularly-shaped particle is an extruded pellet or crushed pellet. An example of a regularly-shaped particle is a microsphere. Thus, the irregular particles are less elutriatable than regularly-shaped particles having about the same particle density and hydraulic diameter. Thus, in a dual phase system using less elutriatable intermediate pore zeolite catalyst particles and more elutriatable large pore zeolite catalyst particles, the catalyst withdrawn from first bed 16 through withdrawal conduit 28 would have a higher ratio of intermediate pore zeolite catalyst particles to large pore zeolite catalyst particles than would the catalyst withdrawn from second bed 34 through withdrawal conduit 54. This minimizes hydrothermal deactivation of the intermediate pore zeolite. Thus, lower amounts of this zeolite are needed to achieve the same benefits.

Combustion gases from second bed 34, which do not exit as part of second flue gas stream 40, pass upwardly through the collecting chamber 30 to a cyclone 60, which separates gaseous material from entrained catalyst particles and passes the gaseous materials through an overhead conduit 62 to a plenum chamber 70 and out of the plenum chamber 70 through a withdrawal conduit 74 as a third flue gas stream 72. A number of cyclones, such as cyclone 60, in series or parallel, or both, may be provided within chamber 30. Solids separated by cyclone 60 return to second catalyst bed 34 through a dipleg 61.

Figure 2:
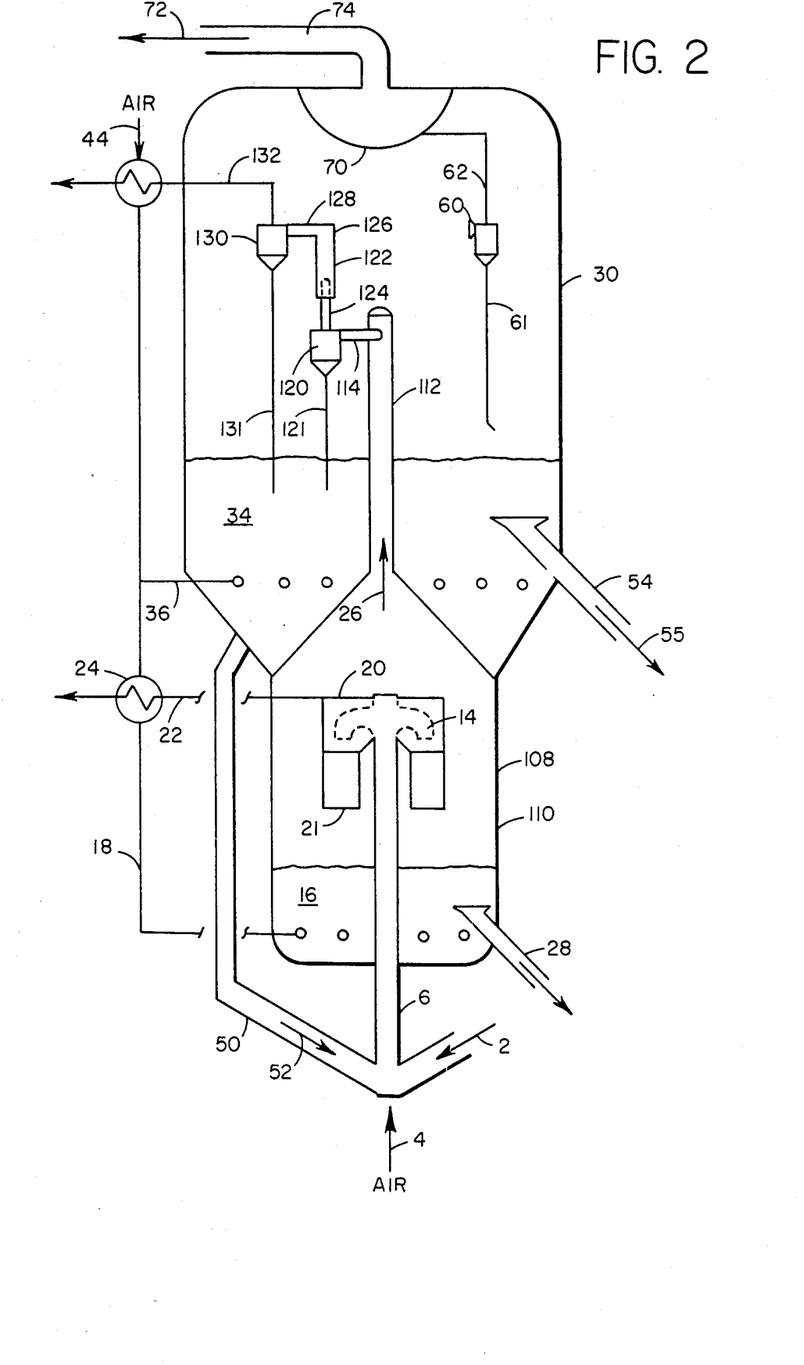
FIG. 2 is a schematic representation of a partial cross-section of a fluid catalytic cracking (FCC) regenerator of a second embodiment of the present invention.

In a second embodiment of the present invention, shown in FIG. 2, the combination of discharge arms 32 and riser cover 38 of FIG. 1 is replaced by a series of closed cyclones. Like-numbered features in FIGS. 1 and 2 operate in the same way. U.S. Pat. No. 4,404,095 to Haddad et al discloses discharge arms and a riser cover applied to a stripping section of a fluid catalytic cracking reactor vessel and is incorporated herein by reference. U.S. Pat. No. 4,502,947 to Haddad et al shows a closed cyclone system applied to a fluid catalytic cracking reactor vessel, and is also incorporated herein by reference. As shown in FIG. 2, the catalyst stream 2, airstream 4, and preferably the regenerated recycle catalyst stream 52, are combined and pass upwardly through the first regenerator riser 6 into a second regenerator riser 108 having a lower portion 110 attached to an upper portion 112. A flue gas stream 22 is separated from the catalyst discharged from the riser 6 and the remaining catalyst from the mixture passes to a first catalyst bed 16. A first portion 26 of catalyst passes upwardly from bed 16 through the upper portion 112 of the second riser 108. A second portion of catalyst is withdrawn through withdrawal conduit 28 from bed 16 and passes to a fluid catalytic cracking reactor (not shown).

The first portion 26 of catalyst discharges from the upper portion 112 into a riser cyclone inlet conduit 114 to a riser cyclone 120. The riser cyclone 120 is connected to a primary cyclone 130 by means of a riser cyclone overhead conduit 122. The primary cyclone 130 may be attached to a secondary cyclone (not shown) by a conventional enclosed conduit (not shown). Overhead gas from the primary cyclone 130, or secondary cyclones in series (not shown), forms a second flue gas stream which exits the collecting vessel 30 through an overhead conduit 132.

The riser cyclone overhead conduit 122 includes a lower vertical conduit 124, attached to the cyclone 120, which is inserted into an upper vertical conduit 126. Conduit 126 is, in turn, attached to a primary cyclone inlet conduit 128. An annulus forms between conduit 124 and conduit 126 so that a portion of gas from catalyst bed 34 may pass into upper conduit 126. Preferably, the annulus is sized such that the gas passes into the annulus at a velocity between 5 and 100 ft/sec. Catalyst separated in cyclones 120 and 130 pass through diplegs 121, 131 to the second catalyst bed 34. The combustion gases from second bed 34, which do not exit as part of the second flue gas stream, pass into one or more cyclones 60 and exit through overhead conduit 62 to plenum chamber 70 and through the withdrawal conduit 74 as a third flue gas stream 72. Catalyst separated in cyclone 60 returns to the second catalyst bed 34 through a dipleg 61.

Figure 3:
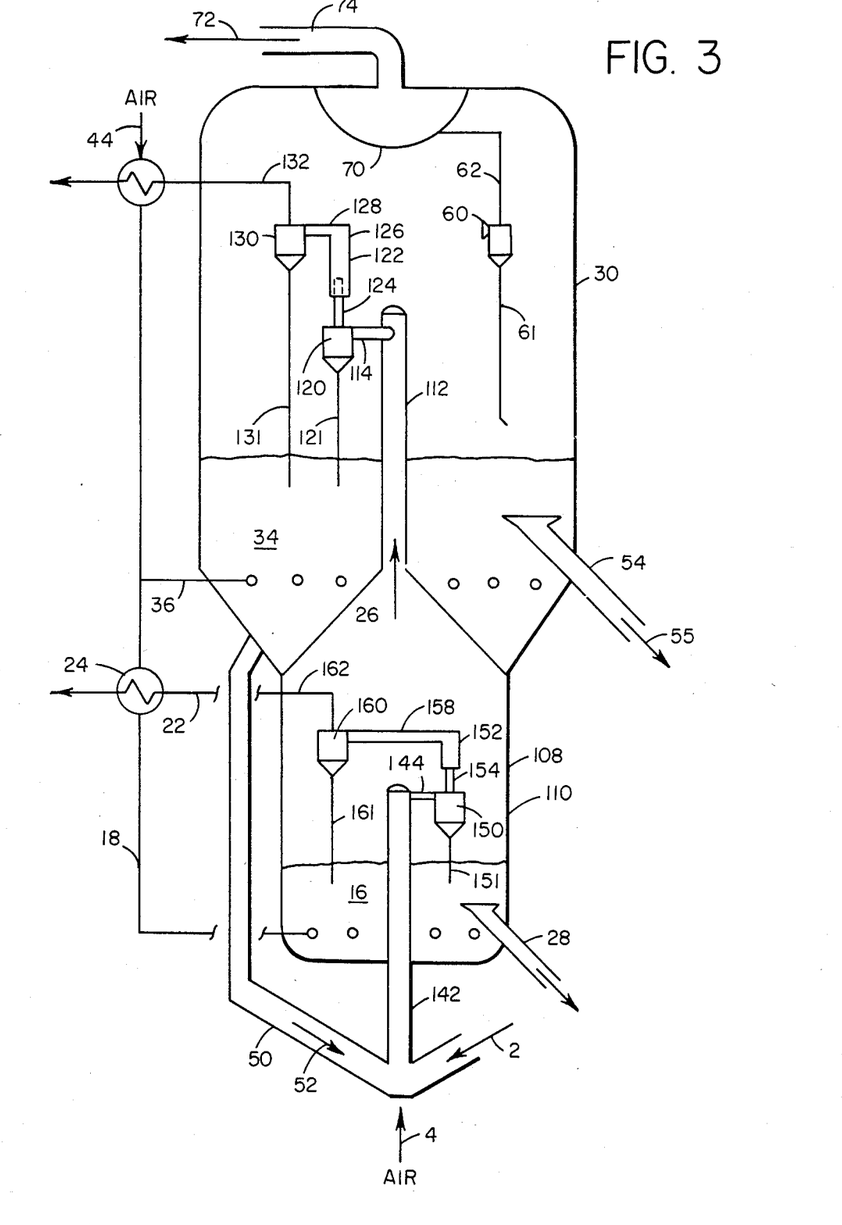
FIG. 3 is a schematic representation of a partial cross-section of a fluid catalytic cracking (FCC) regenerator of a third embodiment of the present invention.

In a third embodiment of the present invention, shown in FIG. 3, the combination of discharge arms 14 and riser cover 20 of FIG. 2 is replaced by a series of closed cyclones. Like-numbered features in FIGS. 1-3 operate in the same way. U.S. Pat. No. 4,404,095 to Haddad et al discloses discharge arms and a riser cover applied to a stripping section of a fluid catalytic cracking reactor vessel and is incorporated herein by reference. U.S. Pat. No. 4,502,947 to Haddad et al shows a closed cyclone system applied to a fluid catalytic cracking reactor vessel, and is also incorporated herein by reference. As shown in FIG. 3, the catalyst stream 2, airstream 4, and preferably the regenerated recycle catalyst stream 52, are combined and pass upwardly through a first regenerator riser 142 into a second regenerator riser 108 having a lower portion 110 attached to an upper portion 112. A closed cyclone system separates a flue gas stream 22 from the catalyst discharged from the riser 142, as discussed below. The remaining catalyst from the mixture passes to a first catalyst bed 16. A first portion 26 of catalyst passes upwardly from bed 16 through the upper portion 112 of the second riser 108. A second portion of catalyst is withdrawn through withdrawal conduit 28 from bed 16 and passes to a fluid catalytic cracking reactor (not shown).

The closed cyclone system for separating the flue gas stream 22 from the catalyst discharged from the riser is described as follows. The catalyst discharges from the riser 142 into a riser cyclone inlet conduit 144 to a riser cyclone 150. The riser cyclone 150 is connected to a primary cyclone 160 by means of a riser cyclone overhead conduit 152. The primary cyclone 160 may be attached to a secondary cyclone (not shown) by a conventional enclosed conduit (not shown). Overhead gas from the primary cyclone 160, or secondary cyclones in series (not shown), forms the flue gas stream 22 which exits the second riser 108 through an overhead conduit 162.

The riser cyclone overhead conduit 152 includes a lower vertical conduit 154, attached to the cyclone 150, which is inserted into an upper vertical conduit 156. Conduit 156 is, in turn, attached to a primary cyclone inlet conduit 158. An annulus forms between conduit 154 and conduit 156 so that a portion of gas from catalyst bed 16 may pass into upper conduit 156. Preferably, the annulus is sized such that the gas passes into the annulus at a velocity between 5 and 100 ft/sec. Catalyst separated in cyclones 150 and 160 pass through diplegs 151, 161 to the second catalyst bed 16.

The present invention has the advantage that regenerating fluid catalytic cracking catalyst in stages and quickly removing water-containing flue gas from the catalyst in each stage minimizes hydrothermal degradation. Displacing flue gas away from catalyst assists this quick removal. The present invention is particularly advantageous when employed with a dual phase catalyst system which includes an intermediate pore zeolite, such as ZSM-5, in a less elutriatable catalyst particle, and a large pore zeolite, such as zeolite Y, in a more elutriatable catalyst particle. The present invention separates a substantial portion of intermediate pore zeolite catalyst from the larger pore zeolite catalyst prior to passing the larger pore zeolite catalyst to the third (hottest) regeneration stage. This prevents subjecting the intermediate pore zeolite catalysts to the high temperatures of the third stage. This is particularly advantageous because intermediate pore zeolites do not become as coke deactivated as the larger pore zeolites, and therefore do not need the higher temperatures of the third stage to remove the coke completely. Thus, a lower concentration of intermediate pore zeolites need to be used to achieve the same benefits.

While specific embodiments of the process of the present invention have been shown and described, it is apparent that many modifications can be made thereto without departing from the spirit and scope of the invention. Accordingly, the invention is not limited by the foregoing description, but is only limited by the scope of the claims appended hereto.

We claim:

1. A process for regenerating a spent fluid catalytic cracking catalyst stream, comprising the steps of:

combining said spent catalyst stream with a first oxygen-containing stream to form a mixture, wherein said spent fluid catalytic cracking catalyst stream comprises, as a first catalyst component, particles of a cracking catalyst which requires relatively frequent regeneration and, as a second catalyst component, particles of a catalyst which requires less frequent regeneration than the first catalyst component, at least one physical characteristic of said particles of said first catalyst component differs sufficiently from at least one physical characteristic of said particles of said second catalyst component as to permit their separation;

passing said mixture through a first regenerator riser at catalyst regeneration conditions;

discharging said mixture from said riser;

separating a first flue gas stream from said discharged mixture, and passing a remainder of said mixture to a first catalyst bed located in a lower portion of a second regenerator riser;

regenerating catalyst in said first bed by contacting said first bed with a second oxygen-containing stream;

upwardly passing a first portion of partially regenerated catalyst from said first bed to an upper portion of said second riser and downwardly withdrawing a second portion of partially regenerated catalyst from said first bed;

discharging said first portion of partially regenerated catalyst from said second riser into a catalyst collecting chamber;

separating a second flue gas stream from said discharged first portion of partially regenerated catalyst and passing a remainder of said first portion to a second catalyst bed located in said collecting chamber;

regenerating catalyst in said second bed by contacting said second bed with a third oxygen-containing stream;

withdrawing a first portion of regenerated catalyst from said second bed; and withdrawing a third flue gas stream from an atmosphere of said collecting chamber, wherein said first catalyst portion of said first bed passes to an upper portion of said second riser;

said catalyst which requires more frequent regeneration comprising large pore crystalline zeolite catalyst particles and said catalyst which requires less frequent regeneration comprising intermediate pore crystalline zeolite catalyst particles, said intermediate pore zeolite catalyst particles being sufficiently less elutriatable than said large pore zeolite catalyst particles, such that said second portion of partially regenerated catalyst from said first catalyst bed has a higher ratio of intermediate pore zeolite catalyst particles to large pore zeolite catalyst particles than said first portion of partially regenerated catalyst from said first catalyst bed, whereby the intermediate pore zeolite catalyst particles are separated from the large pore zeolite catalysts prior to said regenerating in said second bed and are then passed directly to a riser conversion zone of a fluid catalytic cracking reactor.

2. The process of claim 1, wherein said mixture passes through said first riser at regenerating conditions comprising a mixture temperature between 1000° and 1250° F., maintaining said first bed at a temperature between 50° F. above said mixture temperature and 1400° F., and maintaining said second bed at a temperature between 25° F. above said first bed temperature and 1600° F.

3. The process of claim 1, wherein the intermediate pore zeolite particles are separated from the large pore zeolite catalyst prior to said regenerating catalyst in said first bed and are then passed directly to a riser conversion zone of a fluid catalytic cracking reactor.

4. The process of claim 1, wherein the average particle density of said intermediate pore zeolite catalyst particles is greater than that of said large pore zeolite catalyst particles.

5. The process of claim 1, wherein an average particle size of said intermediate pore zeolite catalyst particles is greater than that of said large pore zeolite catalyst particles.

6. The process of claim 5, wherein the average particle density of said intermediate pore zeolite catalyst particles is greater than that of said large pore zeolite catalyst particles.

7. The process of claim 1, wherein said intermediate pore zeolite catalyst particles are more irregular than said large pore zeolite catalyst particles.

8. The process of claim 7, wherein the average particle density of said intermediate pore zeolite catalyst particles is greater than that of said large pore zeolite catalyst particles.

9. The process of claim 1, wherein said mixture discharged from said first riser is downwardly directed by contact with a first plurality of arms extending radially from an upper discharge end of said first riser and said first plurality of arms is within a first riser cover, and said first flue gas stream is separated by countercurrently said discharged mixture with an upwardly passing gas stream within said first riser cover, thereby displacing said first flue gas away from said discharged mixture.

10. The process of claim 9, wherein said first portion of catalyst discharged from said second riser is downwardly directed by contact with a second plurality of arms extending radially from an upper discharge end of said second riser and said second plurality of arms is within a second riser cover, and said second flue gas stream is separated by countercurrently contacting said discharged first portion with an upwardly passing gas stream within said second riser cover, thereby displacing said second flue gas away from said discharged first portion.

11. The process of claim 1, wherein a closed cyclone system separates said second flue gas stream from said first portion of catalyst discharged from said second riser.

12. The process of claim 1, wherein a closed cyclone system separates said first flue gas stream from said mixture discharged from said first riser.

13. The process of claim 11, wherein a closed cyclone system separates said first flue gas stream from said mixture discharged from said first riser.

14. The process of claim 1, further comprising the step of heating said second and third oxygen-containing streams by indirect heat exchange with said first and second flue gas streams prior to passing into said first and second catalyst beds, respectively.

15. The process of claim 1, further comprising the step of recycling a portion of second regenerated catalyst from said second bed to said first regenerator riser.

16. The process of claim 15, wherein said portion of second regenerated catalyst is withdrawn from a lower portion of said second catalyst bed and then recycled to said first regenerator riser, and another portion of second regenerated catalyst is withdrawn from a lower portion of said second catalyst bed.

17. The process of claim 15, wherein said third flue gas stream is produced by cyclonically separating gasiform material in an upper portion of said collecting chamber.

18. The process of claim 1, wherein said large pore zeolite is selected from the group consisting of zeolite X, Y, REY, USY, RE-USY, mordenite and mixtures thereof, and said intermediate pore zeolite is selected from the group consisting of ZSM-5, ZSM-11, ZSM-12, ZSM-23, ZSM-35, ZSM-38 and ZSM-48.

19. The process of claim 18, wherein said large pore zeolite is zeolite Y and said intermediate pore zeolite is ZSM-5.

20. A process for regenerating a spent fluid catalytic cracking catalyst stream comprising ZSM-5 containing catalyst particles and zeolite Y catalyst particles from a fluid catalytic cracking reactor, comprising the steps of:

combining said spent catalyst stream with a second portion of regenerated catalyst and a first oxygen containing stream to form a mixture;

passing said mixture through a first regenerator riser at regenerating conditions comprising a mixture temperature between 1000° and 1250° F.;

discharging said mixture from said first riser into a lower portion of a second regenerator riser, said second riser lower portion having a larger inside diameter than an upper portion of said second riser;

separating a first portion of flue gas from said discharged mixture;

downwardly directing said mixture from said first riser through a riser cover to a first catalyst bed located in said lower portion of said second riser;

regenerating catalyst in said first bed by contacting said first bed with a second oxygen-containing gas stream, and maintaining said catalyst in said first bed at a temperature between at least 50° F. above said mixture temperature and 1400° F.;

passing a first portion of partially regenerated catalyst from an upper portion of said first bed into said upper portion of said second riser and withdrawing a second portion of partially regenerated catalyst from a lower portion of said first bed, said ZSM-5 catalyst particles being sufficiently less elutriatable than said zeolite Y catalyst particles, such that said second portion of said first bed catalyst has a higher ratio of ZSM-5 to zeolite Y than said first portion of said first bed catalyst;

discharging said first portion from said second riser into an enlarged catalyst collecting chamber;

downwardly directing said first portion from said second riser to a second catalyst bed located in a lower portion of said collecting chamber;

withdrawing a second flue gas stream from said first portion prior to discharging said first portion from said second riser;

regenerating catalyst in said second bed by contacting said second bed with a third oxygen-containing gas stream and maintaining said second bed at a temperature between at least 25° F. above said first bed temperature and 1600° F.;

recycling said second portion of regenerated catalyst from said second bed to said first riser;

withdrawing a first portion of regenerated catalyst from said second bed;

withdrawing a third flue gas stream from an atmosphere of said collecting chamber above said second bed.

21. A process for regenerating a spent fluid catalytic cracking catalyst stream, comprising the steps of:

combining said spent catalyst stream with a first oxygen-containing stream to form a mixture;

passing said mixture through a first regenerator riser at catalyst regeneration conditions;

discharging said mixture from said riser;

separating a first flue gas stream from said discharged mixture, and passing a remainder of said mixture to a first catalyst bed located in a lower portion of a second regenerator riser;

regenerating catalyst in said first bed by contacting said first bed with a second oxygen-containing stream; and heating said second oxygen-containing stream by indirect heat exchange with said first flue gas stream prior to contacting said second oxygen-containing stream with said first catalyst bed.

22. The process of claim 21, further comprising the steps of:

upwardly passing a first portion of catalyst from said first bed to an upper portion of said second riser and downwardly withdrawing a second portion of catalyst from said first bed;

discharging said first portion from said second riser into a catalyst collecting chamber;

separating a second flue gas stream from said discharged first portion and passing a remainder of said first portion to a second catalyst bed located in said collecting chamber;

regenerating catalyst in said second bed by contacting said second bed with a third oxygen-containing stream;

heating said third oxygen-containing stream by indirect heat exchange with said second flue gas stream prior to contacting said third oxygen-containing stream with said second catalyst bed;

withdrawing a portion of regenerated catalyst from said second bed; and withdrawing a third flue gas stream from an atmosphere of said collecting chamber.

23. An apparatus for regenerating a spent fluid catalytic cracking catalyst stream, comprising:

a first regenerator riser for passing a mixture of said spent catalyst stream and a first oxygen-containing stream therethrough at catalyst regeneration conditions, wherein said spent catalyst stream comprises particles of a first and second catalyst component, and particles of said first catalyst component are separable from particles of said second catalyst component according to at least one differing physical characteristic of said first and second catalyst component particles;

means for discharging said mixture from said first riser;

a second regenerator riser;

first means for separating a first flue gas stream from said discharged mixture and directing a remainder of said mixture to a first catalyst bed located in a lower portion of said second regenerator riser;

means for contacting catalyst in said first bed with a second oxygen-containing stream thereby regenerating said first bed catalyst;

means for upwardly passing a first portion of catalyst from said first bed to an upper portion of said second riser and a conduit for downwardly withdrawing a second portion of catalyst from said first bed;

means for discharging said first portion from said second riser into a catalyst collecting chamber;

second means for separating a second flue gas stream from said discharged first portion and directing a remainder of said first portion to a second catalyst bed located in said collecting chamber;

means for contacting catalyst in said second bed with a third oxygen-containing stream, thereby regenerating said second bed catalyst;

a conduit for withdrawing a portion of regenerated catalyst from said second bed; and means for withdrawing a third flue gas stream from an atmosphere of said collecting chamber.

24. The apparatus of claim 23, further comprising means for heating said second and third oxygen-containing streams by indirect heat exchanger with said first and second flue gas streams.

25. The apparatus of claim 23, wherein said first means for separating and directing the catalyst from the flue gas comprises a first plurality of downwardly directed arms, which radially extend from said first riser, and a first riser cover which surrounds said arms and has an open bottom.

26. The apparatus of claim 25, wherein said second means for separating and directing the catalyst from the flue gas comprises a second plurality of downwardly directed arms, which radially extend from said second riser, and a second riser cover which surrounds said second arms and has an open bottom.

27. The apparatus of claim 25, wherein said second means for separating and directing the catalyst from the flue gas comprises a closed cyclone system attached to said second riser.

28. The apparatus of claim 27, wherein said first means for separating and directing the catalyst from the flue gas comprises a closed cyclone system attached to said first risers.

29. The apparatus of claim 25, wherein said first means for separating and directing the catalyst from the flue gas comprises a closed cyclone system attached to the first riser.

30. An apparatus for regenerating a spent fluid catalytic cracking catalyst system comprising ZSM-5 catalyst particles and zeolite Y catalyst particles from a fluid catalytic cracking reactor, comprising:

a first regenerator riser for passing a mixture of said spent catalyst stream, a regenerated recycle catalyst and a first oxygen-containing stream therethrough at regenerating conditions;

a second regenerator riser comprising an upper portion and a lower condition;

means for discharging said mixture from said first riser into said lower portion of said second regenerator riser and downwardly directing said mixture from said first riser to a first catalyst bed located in said lower portion of said second riser;

means for separating a first portion of flue gas from said discharged mixture, said means for separating comprising a riser cover which surrounds said means for discharging and directing;

means for contacting catalyst in said first bed with a second oxygen-containing gas stream thereby regenerating said first bed catalyst;

means for passing a first portion of catalyst from an upper portion of said first bed into said upper portion of said second riser and a conduit for withdrawing a second portion of catalyst from a lower portion of said first bed, said ZSM-5 catalyst particles being sufficiently less elutriatable than said zeolite Y catalyst particles, such that said second portion of said first bed catalyst has a higher ratio of ZSM-5 to zeolite Y than said first portion of said first bed catalyst;

an enlarged catalyst collecting chamber comprising an upper portion and a lower portion;

means for discharging said first portion from said second riser into said enlarged catalyst collecting chamber and downwardly directing said first portion from said second riser to a second catalyst bed located in said lower portion of said collecting chamber;

means for withdrawing a second flue gas stream from said first portion prior to discharging said first portion from said second riser;

means for contacting catalyst in said second bed with a third oxygen-containing gas stream thereby regenerating said second bed catalyst;

a conduit for recycling said regenerated recycle catalyst from said second bed to said first riser;

a conduit for withdrawing a first portion of regenerated catalyst from said second bed;

means for withdrawing a third flue gas stream from an atmosphere of said collecting chamber above said second bed.

* * * * *